US012116522B2

(12) United States Patent
Kim et al.

(10) Patent No.: US 12,116,522 B2
(45) Date of Patent: Oct. 15, 2024

(54) HYBRID THERMAL MANAGEMENT FILM AND METHOD OF FABRICATION FOR THE SAME

(71) Applicant: KOREA NATIONAL UNIVERSITY OF TRANSPORTATION Industry-Academic Cooperation Foundation, Chungcheongbuk-do (KR)

(72) Inventors: Sung Ryong Kim, Gyeonggi-do (KR); Minh Canh Vu, Chungcheongbuk-do (KR)

(73) Assignee: KOREA NATIONAL UNIVERSITY OF TRANSPORTATION Industry-Academic Cooperation Foundation, Chungcheongbuk-do (KR)

( * ) Notice: Subject to any disclaimer, the term of this patent is extended or adjusted under 35 U.S.C. 154(b) by 0 days.

(21) Appl. No.: 17/398,959

(22) Filed: Aug. 10, 2021

(65) Prior Publication Data
US 2022/0041912 A1    Feb. 10, 2022

(30) Foreign Application Priority Data
Aug. 10, 2020 (KR) ................ 10-2020-0100099

(51) Int. Cl.
*C09K 5/14*     (2006.01)
*C01B 32/19*    (2017.01)
(Continued)

(52) U.S. Cl.
CPC ............... *C09K 5/14* (2013.01); *C01B 32/19* (2017.08); *C01B 32/198* (2017.08);
(Continued)

(58) Field of Classification Search
CPC ......... C09K 5/14; C01B 32/182; C01B 32/19; C01B 32/194; C01B 32/198; C01B 32/225; C08K 3/042; B82Y 30/00; B82Y 40/00
See application file for complete search history.

(56) References Cited

U.S. PATENT DOCUMENTS 9,346,991 B2 *   5/2016  Arzberger ............... C09K 5/14
9,959,948 B2 *   5/2018  Zhamu ................... C01B 32/20
(Continued)

FOREIGN PATENT DOCUMENTS

JP       2020097201 A    6/2020
KR       101262998 B1    9/2013
(Continued)

OTHER PUBLICATIONS

Vu et al. ("Highly flexible graphene derivative hybrid film: an outstanding nonflammable thermally conductive yet electrically insulating material for efficient thermal management," ACS Appl. Mater. Interfaces 2020, 12, 26413-26423) (Year: 2020).*
(Continued)

*Primary Examiner* — Matthew R Diaz
(74) *Attorney, Agent, or Firm* — Berkeley Law & Technology Group, LLP

(57) ABSTRACT

A hybrid thermal management film according to the present disclosure includes graphene fluoride nanosheets (GFS) and reduced graphene oxide (rGO). The hybrid thermal management film according to the present disclosure is a thermal management film applicable to electronic devices, particularly to wearable electronic devices, which has excellent thermal conductivity, electrical insulation, and flame retardancy, as well as excellent mechanical flexibility.

10 Claims, 14 Drawing Sheets

(51) Int. Cl.
   *C01B 32/198*   (2017.01)
   *C01B 32/225*   (2017.01)
   *H01B 3/00*     (2006.01)
   *B82Y 30/00*        (2011.01)
   *B82Y 40/00*        (2011.01)

(52) U.S. Cl.
   CPC ........... *C01B 32/225* (2017.08); *H01B 3/004* (2013.01); *B82Y 30/00* (2013.01); *B82Y 40/00* (2013.01)

(56) References Cited

U.S. PATENT DOCUMENTS

| | | | |
|---|---|---|---|
| 10,010,859 B2 * | 7/2018 | Zhamu | ............... B01J 20/28066 |
| 2020/0185704 A1 | 6/2020 | Zhamu et al. | |
| 2020/0339423 A1 * | 10/2020 | Lin | .................... H05K 7/20336 |
| 2021/0063098 A1 * | 3/2021 | Lin | ......................... F28F 21/02 |
| 2021/0079282 A1 * | 3/2021 | Lin | .......................... C09K 5/14 |
| 2021/0362471 A1 * | 11/2021 | Zhamu | ..................... B32B 9/04 |

FOREIGN PATENT DOCUMENTS

| | | | |
|---|---|---|---|
| KR | 1020170043472 A | 4/2017 | |
| KR | 1020200035091 A | 4/2020 | |
| WO | WO-2020186881 A1 * | 9/2020 | ............... C09K 5/14 |

OTHER PUBLICATIONS

Office Action, Mailed Nov. 19, 2021, App. No. KR10-2020-0100099, Filed Aug. 10, 2020, 4 Pages.

Zhao, et al, "Preparation of Colloidal Dispersions of Graphene Sheets in Organic Solvents by Using Ball Milling," Journal of Nanomaterials, vol. 2010, Article ID 528235, Accepted Jul. 8, 2010, 6 Pages.

Rongguo, et al, "Preparation and Properties of MOS2 Nanosheets and MOS2 Nanosheets/Epoxy Composites," 20th International Conference on Composite Materials, Copenhagen, Jul. 19-24, 2015, 8 Pages.

Canh, et al, "Highly Flexible Graphene Derivative Hybrid Film: An Outstanding Nonflammable Thermally Conductive yet Electrically Insulating Material for Efficient Thermal Management," Applied Materials & Interfaces, www.acsami.org, http://dx.doi.org/10.1021/acsami.0c02427, Downloaded May 30, 2020, 11 Pages.

Grant of Patent, App. No. KR10-2020-0100099, Dated May 24, 2022, 4 Pages.

* cited by examiner

HYBRID THERMAL MANAGEMENT FILM AND METHOD OF FABRICATION FOR THE SAME

CROSS-REFERENCE TO RELATED APPLICATION

This application claims benefit of priority to Korean Patent Application No. 10-2020-0100099, entitled "HYBRID THERMAL MANAGEMENT FILM AND METHOD OF FABRICATION FOR THE SAME" and filed on Aug. 10, 2020, in the Korean Intellectual Property Office, the entire disclosure of which is incorporated herein by reference.

BACKGROUND

1. Technical Field

The present disclosure relates to a hybrid thermal management film, and a method for manufacturing the same. More specifically, the present disclosure relates to a hybrid thermal management film which, due to its excellent thermal conductivity and mechanical properties, may be used as a thermal management film of electronic devices, and a method for manufacturing the same.

2. Background

Electronic devices have been miniaturized along with advancements in the performance thereof. In particular, as electronic devices become thinner and thinner, high-integration and large-capacity of electronic components used in the electronic devices have been realized at the same time. Accordingly, thermal management performance of these electronic devices is recognized as a key factor in terms of the performance of the electronic devices.

For example, as small electronic devices such as LEDs, smart phones, or tablet PCs generate more heat, it is very important to effectively discharge heat generated inside these small electronic devices to the outside. In the case of the automotive field, since components through which high current flows are necessarily used in hybrid vehicles or fuel cell vehicles, it is important to discharge heat generated therefrom to the outside.

When heat generated during operation of these electronic devices continues to locally accumulate inside the electronic devices, since an internal temperature of the electronic devices continues to rise, malfunction of the electronic devices may occur or a lifetime of the electronic device may be shortened. In general, it has been reported that when the internal temperature of the electronic devices rises by about 10° C., the lifetime of the electronic devices is decreased by about half.

Accordingly, there is an increasing demand for an excellent thermal management film which has insulating properties as well as high thermal conductivity. In particular, as the development of wearable electronic devices is accelerating in recent years, there is also a growing demand for the development of a thermal management film that is flexible and has excellent mechanical properties and thus may effectively be applied to wearable electronic devices.

SUMMARY

The present disclosure is directed to providing a hybrid thermal management film that has excellent thermal conductivity, electrical insulation, and flame retardancy, as well as excellent mechanical flexibility, wherein such hybrid thermal management film is advantageously applicable to electronic devices, in particular to wearable electronic devices.

A hybrid thermal management film according to some embodiments of the present disclosure includes graphene fluoride nanosheets (GFS) and reduced graphene oxide (rGO).

In the hybrid thermal management film according to some embodiments of the present disclosure, the reduced graphene oxide is included in an amount of 5 wt % to 20 wt % based on a total weight of the hybrid thermal management film.

In the hybrid thermal management film according to some embodiments of the present disclosure, the graphene fluoride nanosheets are exfoliated from graphite fluoride.

In the hybrid thermal management film according to some embodiments of the present disclosure, a lateral size of the graphene fluoride nanosheets is 100 to 2000 nm.

A method for manufacturing a hybrid thermal management film according to some embodiments of the present disclosure includes: preparing graphene fluoride nanosheets, mixing graphene oxide with the graphene fluoride nanosheets, performing vacuum filtration on a mixture of the graphene oxide and the graphene fluoride nanosheets to obtain a hybrid film, and reducing the hybrid film.

In the method for manufacturing the hybrid thermal management film according to some embodiments of the present disclosure, preparing the graphene fluoride nanosheets includes: mixing a solvent with the graphite fluoride, performing ball-milling on a mixture of the solvent and the graphite fluoride to obtain a suspension of the graphene fluoride nanosheets, and performing centrifugation on the suspension to separate the graphene fluoride nanosheets.

In the method for manufacturing the hybrid thermal management film according to some embodiments of the present disclosure, the ball-milling is performed for 2 to 12 hours under nitrogen gas.

In the method for manufacturing the hybrid thermal management film according to some embodiments of the present disclosure, a lateral size of the graphene fluoride nanosheets is 100 to 2000 nm.

In the method for manufacturing the hybrid thermal management film according to some embodiments of the present disclosure, the graphene oxide is included in an amount of 5 wt % to 20 wt % based on a total weight of the mixture.

In the method for manufacturing the hybrid thermal management film according to some embodiments of the present disclosure, in the reducing the hybrid film, the hybrid film is treated with a chemical reducing agent.

In the method for manufacturing the hybrid thermal management film according to some embodiments of the present disclosure, the chemical reducing agent is selected from the group consisting of hydrogen iodide, hydrazine, hydrobromic acid, sodium borohyride, lithium aluminum hydride, hydroquinone, sulfuric acid, and mixtures thereof.

The hybrid thermal management film according to the present disclosure has excellent thermal conductivity in an in-plane direction and excellent electrical insulation. In addition, the hybrid thermal management film according to the present disclosure has excellent mechanical properties such as tensile strength and elongation at break, since the reduced graphene oxide (rGO) is well aligned along a surface of the film and forms a network through connection with the graphene fluoride nanosheets (GFS).

The hybrid thermal management film according to the present disclosure may be applied to flexible electronic devices, since it has been confirmed to not only be lightweight and ultra-thin, but also to have high resistance to bending cycles and excellent flexibility. In addition, the hybrid thermal management film according to the present disclosure has proven to be effective in maintaining thermal stability as well as preventing fire spread due to its excellent fire retardant properties.

By employing the hybrid thermal management film according to the present disclosure, thermal management performance of electronic devices as well as applicability to electronic devices may be effectively enhanced. That is, when used, for example, in electronic circuits, the hybrid thermal management film according to the present disclosure may prevent malfunction and shortening of lifetime of the electronic circuits.

DETAILED DESCRIPTION

Figure 1:
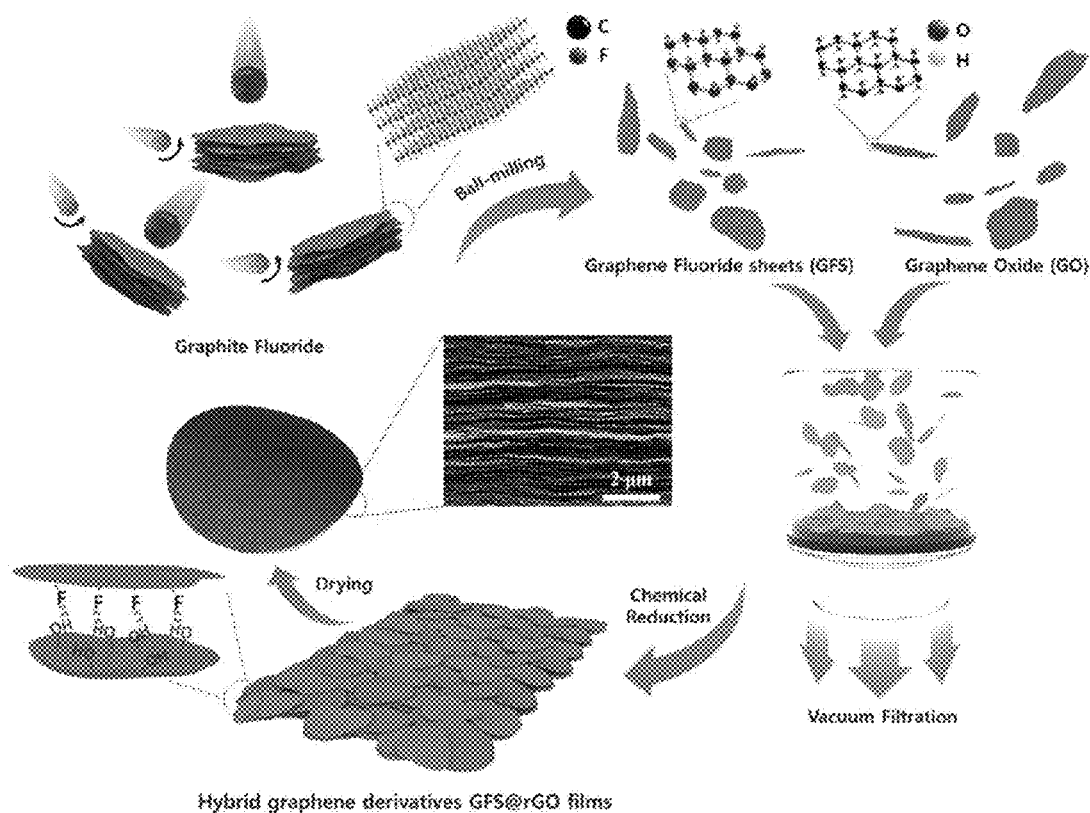
FIG. 1 is a schematic diagram illustrating a method for manufacturing a hybrid thermal management film according to the present disclosure.

Hereinafter, various embodiments of the present disclosure will be described with reference to the accompanying drawings. The embodiments and terms used in these embodiments are not intended to limit the techniques described in the present disclosure to a specific embodiment, but should be understood to include various modifications, equivalents, and/or substitutes of the embodiments.

Hereinafter, embodiments of the present disclosure will be described in detail with reference to the accompanying drawings.

A hybrid thermal management film according to the present disclosure includes graphene fluoride nanosheets (GFS) and reduced graphene oxide (rGO). The hybrid thermal management film according to the present disclosure is a thermal management film applicable to electronic devices, particularly to wearable electronic devices, which has excellent thermal conductivity, electrical insulation, and flame retardancy, as well as excellent mechanical flexibility.

The graphene fluoride nanosheets (GFS) may be nanosheets exfoliated from graphite fluoride. A lateral size of the graphene fluoride nanosheets may be 100 to 2000 nm. When the lateral size of the graphene fluoride nanosheets is less than 100 nm, since a contact area between adjacent graphene fluoride nanosheets is small, an effect of improving in-plane thermal conductivity of the film may be decreased. In addition, when the lateral size of the graphene fluoride nanosheets is greater than 2000 nm, mechanical flexibility of the film may be decreased.

In addition, the reduced graphene oxide (rGO) may be included in an amount of 5 wt % to 20 wt % based on a total weight of the hybrid thermal management film. When a content of the reduced graphene oxide (rGO) is less than 5 wt %, an effect of improving in-plane thermal conductivity of the hybrid thermal management film may be decreased. When the content of the reduced graphene oxide (rGO) exceeds 20 wt %, electrical conductivity of the hybrid thermal management film may become too high, thereby deteriorating electrical insulation of the hybrid thermal management film. However, when the content of the reduced graphene oxide (rGO) is in a range of 5 wt % to 20 wt %, excellent mechanical properties such as tensile strength, Young's modulus, and elongation at break of the hybrid thermal management film may be secured.

In the hybrid thermal management film according to the present disclosure, since the reduced graphene oxide (rGO) is well aligned along a surface of the film and forms a network through connection with the graphene fluoride nanosheets (GFS), mechanical properties such as tensile strength and elongation at break may be enhanced.

A method for manufacturing a hybrid thermal management film according to the present disclosure may include: preparing graphene fluoride nanosheets (GFS), mixing graphene oxide (GO) with the graphene fluoride nanosheets (GFS), performing vacuum filtration on a mixture of the graphene oxide (GO) and the graphene fluoride nanosheets (GFS) to obtain a hybrid thermal management film, and reducing the hybrid thermal management film.

In the preparing the graphene fluoride nanosheets (GFS), graphite fluoride may first be mixed with a solvent. In such a case, the solvent may selected from the group consisting of N-methyl-2-pyrrolidone (NMP), dimethylsulfoxide (DMSO), dimethylformamide (DMF), ethanol, pyridine, dimethylacetamide (DMAc), and pyrrolidone. Preferably, the solvent may be NMP.

Then, ball-milling may be performed on a mixture of the graphite fluoride and the NMP. In such a case, the ball-milling may be performed using zirconia balls having diameters of 2 mm and 0.2 mm (mass ratio 1:1). In addition, the ball-milling may be performed at about 300 rpm for 2 to 12 hours at room temperature under nitrogen gas. When the ball-milling time is less than 2 hours, a exfoliation yield of the graphite fluoride may be decreased. When the ball-milling time exceeds 12 hours, since a lateral size of the exfoliated GFS becomes too small, the effect of improving the thermal conductivity of the finally produced film may be decreased. On the other hand, by performing the ball-milling for 2 to 12 hours, graphene fluoride nanosheets having a lateral size of 100 to 2000 nm may be obtained.

Then, a powder of the graphite fluoride that has not yet been exfoliated may be removed by performing centrifugation on a suspension of the graphene fluoride nanosheets. Then, a supernatant liquid may be filtered and washing may be performed, thereby obtaining a powder of the graphene fluoride nanosheets.

Then, the graphene fluoride nanosheets (GFS) obtained by the above method may be mixed with the graphene oxide (GO). The mixture of the graphene fluoride nanosheets (GFS) and the graphene oxide (GO) may be made homogeneous through ultrasonication. Herein, the graphene oxide may be included in an amount of 5 wt % to 20 wt % based on a total weight of the mixture. In such a case, when a content of the graphene oxide is less than 5 wt %, the effect of improving the thermal conductivity of the finally produced film may be decreased. In addition, when the content of the graphene oxide exceeds 20 wt %, the electrical conductivity of the finally produced film may become too high, thereby deteriorating the electrical insulation of the film.

Then, a hybrid film may be obtained by performing vacuum filtration on the mixture using a membrane filter.

Then, reducing the hybrid film may be performed. In such a case, the graphene oxide may be reduced by treating the hybrid film with a chemical reducing agent. For example, the chemical reducing agent may be selected from the group consisting of hydrogen iodide, hydrazine, hydrobromic acid, sodium borohyride, lithium aluminum hydride, hydroquinone, sulfuric acid, and mixtures thereof. Preferably, the chemical reducing agent may be hydrogen iodide.

Then, excess chemical reducing agent may be removed.

Hereinafter, specific examples of the present disclosure will be described in detail.

However, the following examples are only for illustrating the present disclosure, and the present disclosure is not limited by the following examples.

Example 1—Fabrication of Graphene Fluoride Nanosheets (GFS)

Graphite fluoride (CAS: GTFF012) having an average lateral size of 200 to 500 μm was purchased from ACS Materials Co. (USA), and prepared. A suspension of graphite fluoride powder was manufactured using N-methyl-2-pyrrolidone (NMP) at a concentration of 0.05 g/mL, and 100 mL of the suspension was put into a 500 mL grinding vessel. Then, 2 kg of zirconia balls having diameters of 2 mm and 0.2 mm (mass ratio 1:1) were added to the grinding vessel. A ball-milling process was performed at 300 rpm at room temperature under nitrogen gas for 3 hours, 6 hours, and 12 hours, respectively. Most of multi-layered graphite fluoride powder was exfoliated to form graphene fluoride sheets. In order to remove the graphite fluoride powder that had not yet been exfoliated, the suspension was separated from the zirconia balls and then centrifugation was performed on the suspension at 4000 rpm for 30 minutes. Then, supernatant liquid was filtered, and washing was performed using deionized water. After freeze drying was performed for 2 days, GFS powder was obtained.

Example 2—Fabrication of GFS@rGO (Graphene Fluoride Sheets (GFS) and Reduced Graphene Oxide (rGO)) Hybrid Thermal Management Film Graphene oxide having an average lateral size of 5 to 7 μm was purchased from Standard Graphene Co. (Korea), and prepared. Meanwhile, a pre-calculated amount of GFS powder was dispersed in N-methyl-2-pyrrolidone (NMP) through ultrasonication. A predetermined amount of water-dispersed GO was added to a suspension of the GFS and the resulting mixture was sonicated for 10 minutes to obtain a suspension of a homogeneous GFS/GO. In order to manufacture a hybrid thermal management film with various component ratios, GFS@GO5 (GFS/GO=9.5:0.5), GFS@GO10 (GFS/GO=9.0:1.0), GFS@G015 (GFS/GO=8.5:1.5), and GFS@G020 (GFS/GO=8.0:2.0) were prepared.

The mixed suspension was filtered under vacuum using an Anodisc membrane filter (diameter: 47 mm, pore size: 0.2μ, Whatman™) to obtain GFS@GO hybrid thermal management films with different GO contents. Then, the GFS@GO hybrid thermal management film was exfoliated from the membrane filter and dried in a vacuum oven at 60° C. for 3 days. Then, the dried GFS@GO hybrid thermal management film was immersed in hydrogen iodide (HI) (57%, Sigma Aldrich) in an oil bath at 80° C. for 3 hours. The reduced hybrid thermal management film was washed several times with water to remove excess HI and was dried for further analysis.

Figure 2A:
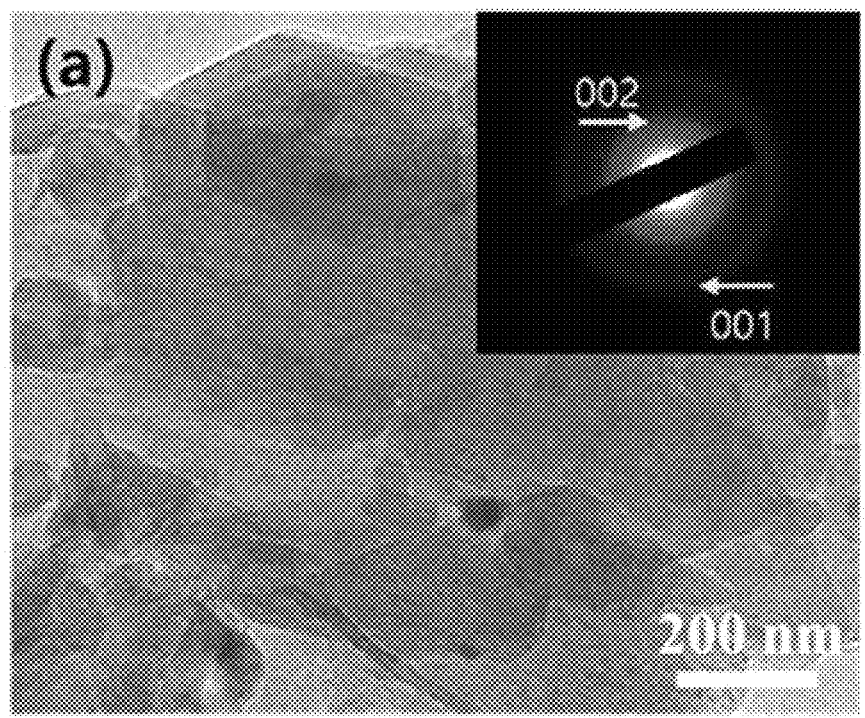
FIG. 2A illustrates a low magnification TEM image of graphene fluoride nanosheets (GFS) generated by performing ball-milling for 3 hours.
Figure 2B:
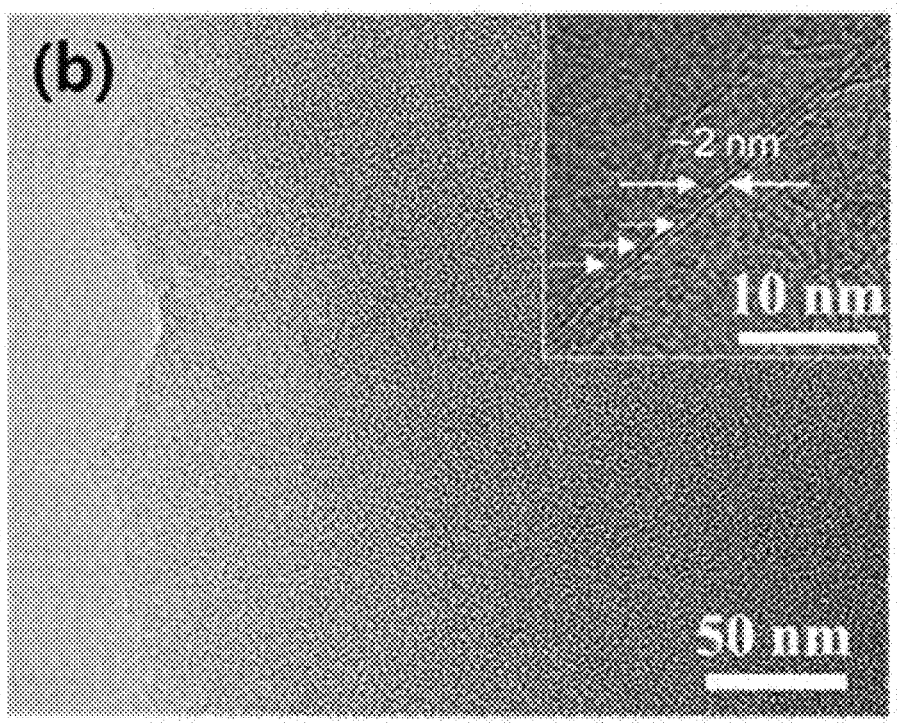
FIG. 2B illustrates a high magnification TEM image of the GFS generated by performing ball-milling for 3 hours.
Figure 2C:
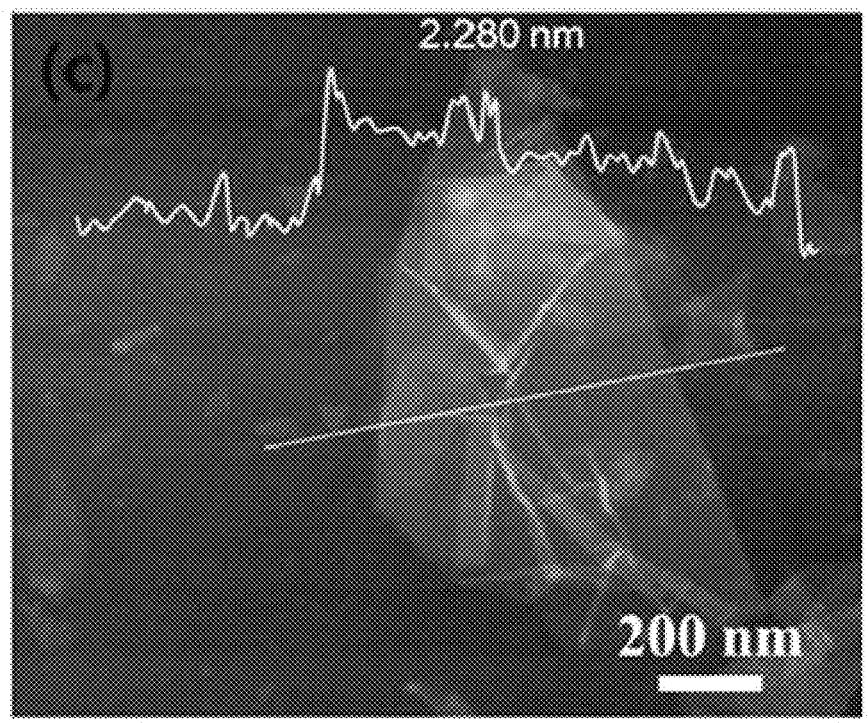
FIG. 2C illustrates an AFM image of the GFS generated by performing ball-milling for 3 hours.

FIG. 2A illustrates a low magnification TEM image of graphene fluoride nanosheets (GFS) generated by performing ball-milling for 3 hours, FIG. 2B illustrates a high magnification TEM image of the GFS generated by performing ball-milling for 3 hours, and FIG. 2C illustrates an AFM image of the GFS generated by performing ball-milling for 3 hours.

The graphite fluoride is about 300 μm in average lateral size and about 30 μm in thickness. However, referring to FIG. 2A, a small-size GFS was exfoliated through the ball-milling, the lateral size of the GFS generated by performing the ball-milling for 3 hours was distributed in a range of 500 to 2000 nm, and the average lateral size of the GFS was about 1250 nm. Meanwhile, although not illustrated in the drawings, when the ball-milling was performed on the GFS for 6 hours, the lateral size of the GFS was distributed in a range of 300 to 1500 nm, and the average lateral size of the GFS was about 600 nm. In addition, when the ball-milling was performed on the GFS for 12 hours, the lateral size of the GFS was distributed in a range of 100 to 700 nm, and the average lateral size of the GFS was about 300 nm. That is, as the ball milling time increased, GFS of a smaller size was exfoliated.

Meanwhile, referring to FIG. 2B, it can be seen that the GFS is flat and very thin. On the other hand, it is well known that the number of layers of the exfoliated GFS is determined through the number of distinguishable edges of the GFS. Referring to an inset image of FIG. 2B, it can be seen that there are three stacked layers with a thickness of about 2 nm at the edge of the GFS. In addition, it can be seen that the edge of the GFS is composed of three parallel fringes corresponding to these three stacked layers.

Referring to FIG. 2C, it can be seen that the thickness of the exfoliated GFS is about 2.2 nm, and corresponds to 3 to 4 single layers. These results show that a graphite fluoride flake may be directly exfoliated into single-layer and few-layer GFS by the ball-milling in an NMP solvent.

Figure 2D:
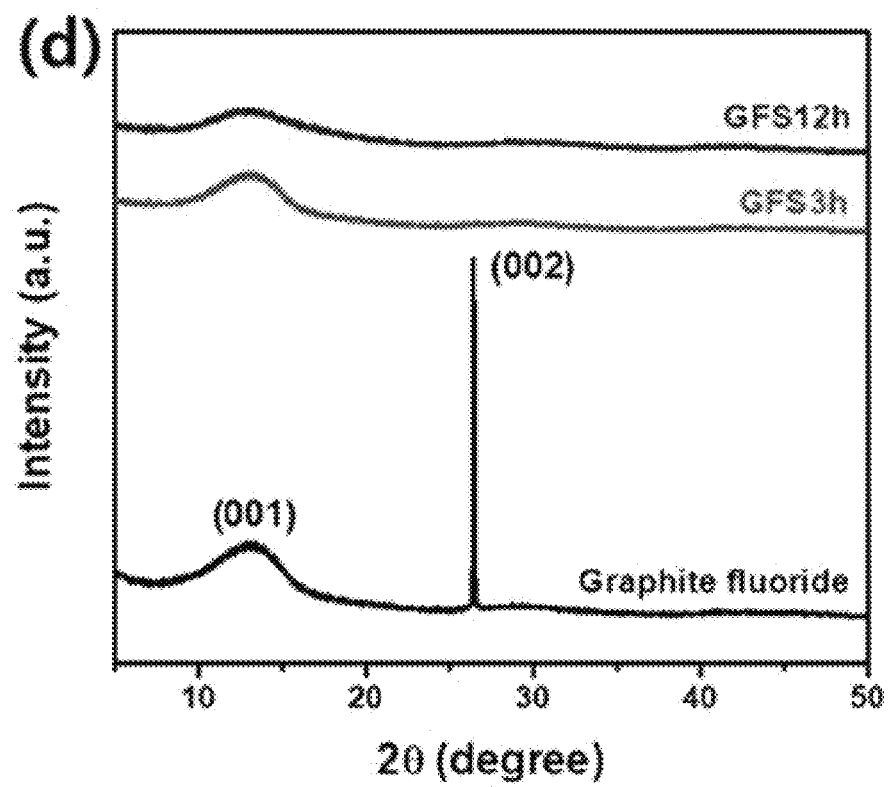
FIG. 2D illustrates XRD diffraction patterns.

FIG. 2D illustrates XRD diffraction patterns of graphite fluoride, GFS (GFS3h) generated by performing ball-milling for 3 hours and GFS (GFS12h) generated by performing ball-milling for 12 hours. Referring to the XRD diffraction patterns of the graphite fluoride illustrated in FIG. 2D, a sharp peak was observed at 26.5°, which corresponds to a (002) high crystallinity diffraction peak of graphite. A broad diffraction peak (20) was observed at 14.5° that corresponds to an interlayer d-spacing of 0.62 nm, which corresponds to (001) related to a high-level fluoride structure of graphene. Referring to XRD diffraction patterns of the GFS3h and the GFS12h exfoliated through the ball-milling, the diffraction peak disappeared at 2θ=26.5°. This indicates that the single-layer or few-layer exfoliation from the stacked layers was successful, and also indicates graphite/graphene conversion.

Figure 2E:
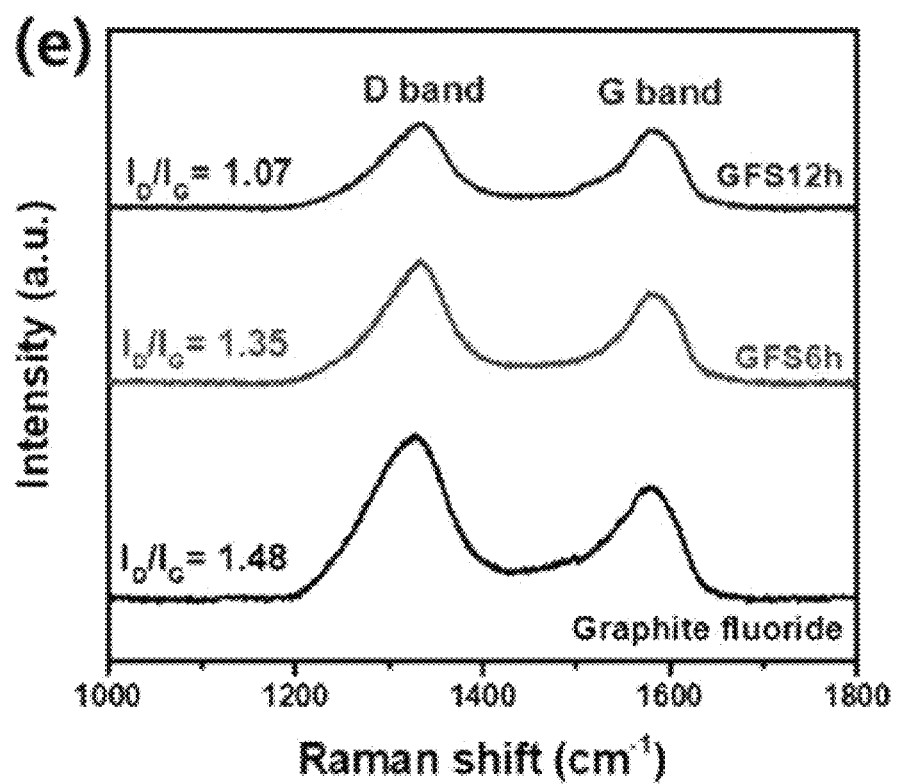
FIG. 2E illustrates Raman spectra data.

FIG. 2E illustrates Raman spectra of graphite fluoride, GFS (GFS6h) generated by performing ball-milling for 6 hours, and GFS (GFS12h) generated by performing ball-milling for 12 hours. Referring to FIG. 2E, the Raman spectra of the graphite fluoride and the GFS indicate a typical D band (1348 $cm^{-1}$) and G band (1585 $cm^{-1}$) that correspond to graphite/graphene. The G band indicates the presence of a graphite structure with a $sp^2$ π-conjugated configuration, and the D band indicates the presence of a C-F $sp^3$ defect. The Raman intensity ratio of D band to G band, expressed as $I_D/I_G$, has been widely used to evaluate atomic scale conjugation. The $I_D/I_G$ ratio in the case of the graphite fluoride is 1.48 and the $I_D/I_G$ ratios in the case of GFS6h and GFS12h decrease to 1.35 and 1.07, respectively, which indicates partial restoration of a $sp^2$ structure due to defluorination during the ball-milling.

Figure 2F:
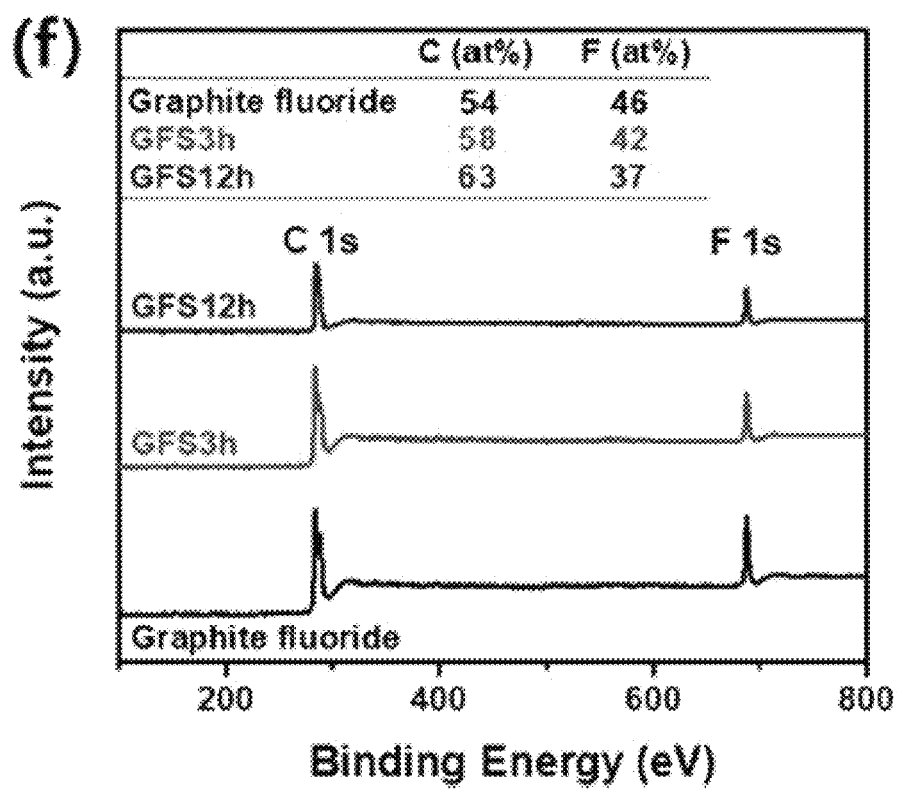
FIG. 2F illustrates XPS spectra data.

FIG. 2F illustrates XPS spectra of graphite fluoride and GFS. Referring to FIG. 2F, elements other than C and F were not observed on surfaces of the graphite fluoride and the GFS. In addition, C 1s and F 1s peaks were concentrated at 284.5 eV and 688 eV, respectively. A relative atomic ratio of carbon to fluorine ($R_{C/F}$) may be estimated from atomic sensitivity coefficients, and peak regions of C 1s and F 1s used to determine an elemental content. As a result of calculation based on an elemental content detected through XPS analysis, the $R_{C/F}$ and F content of the graphite fluoride were found to be 1.2 at % and 46 at %, respectively, whereas the $R_{C/F}$ and F content of the GFS6h were found to be 1.4 at % and 42 at %, respectively, and the $R_{C/F}$ and F content of the GFS12h were found to be 1.7 at % and 37 at %, respectively. It can be confirmed that through the decrease in the amount of fluorine in the GFS, defluorination occurred during the ball milling, which corresponds to the results of the Raman spectra.

Figure 3A:
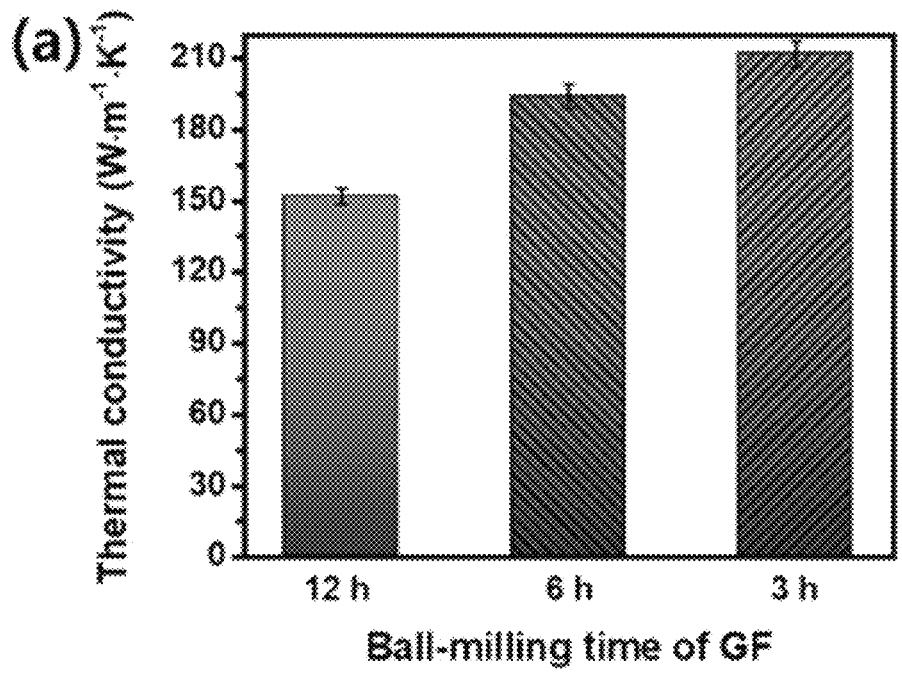
FIG. 3A illustrates in-plane thermal conductivity of GFS@rGO20 hybrid thermal management films that use graphene fluoride nanosheets (GFS) manufactured with different ball-milling times.

Thermal conductivity of the GFS@rGO hybrid thermal management film was evaluated by a laser flash method under various conditions. A lateral size of graphene fluoride nanosheets (GFS) has a significant effect on heat conduction. FIG. 3A illustrates in-plane thermal conductivity of a GFS@rGO20 hybrid thermal management film manufactured using GFS that has different lateral sizes according to different ball-milling times. As a lateral size of GFS increased, thermal conductivity of a GFS@rGO20 hybrid thermal management film increased. The in-plane thermal conductivity of a GFS@rGO20 hybrid thermal management film manufactured using GFS for which the ball-milling was performed for 3 hours and which thus have an average lateral size of 1250 nm, exhibited a high value of 212 $W·m^{-1}·K^{-1}$. Meanwhile, the in-plane thermal conductivity of a GFS@rGO20 hybrid thermal management film manufactured using GFS for which the ball-milling was performed for 6 hours and which thus have an average lateral size of 600 nm, exhibited 191 $W·m^{-1}·K^{-1}$, and the in-plane thermal conductivity of a GFS@rGO20 hybrid thermal management film manufactured using GFS for which the ball-milling was performed for 12 hours and which thus have an average lateral size of 300 nm, exhibited 152 $W·m^{-1}·K^{-1}$. As the lateral size of the GFS increases, a contact area between adjacent GFS may increase. As interfacial phonon scattering is minimized along with the increase in the contact area, the in-plane thermal conductivity of the GFS@rGO20 hybrid thermal management film appears to be increased.

Figure 3B:
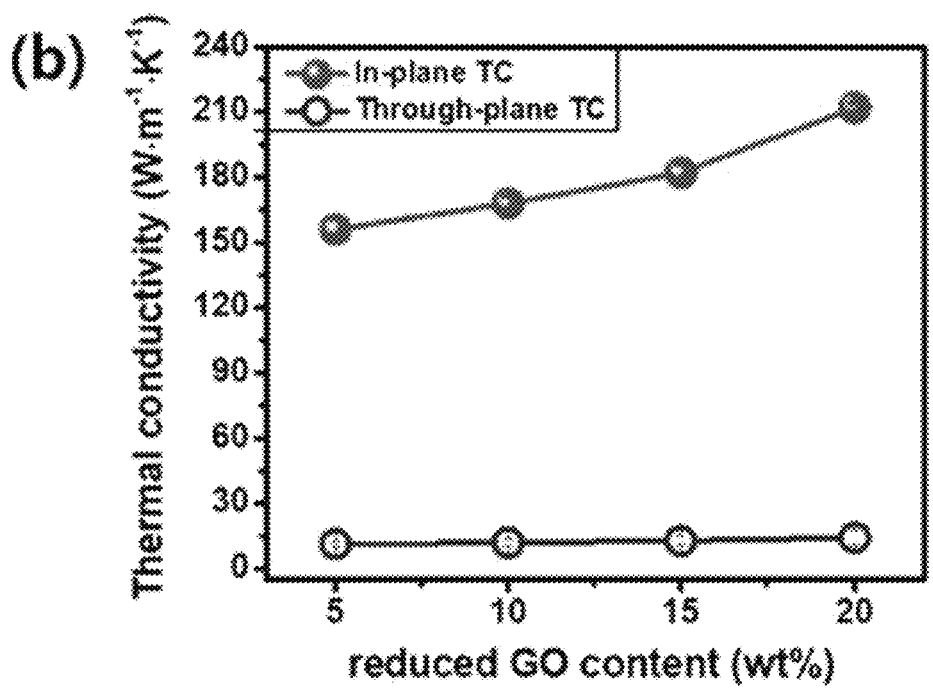
FIG. 3B illustrates results of measuring in-plane thermal conductivity and through-plane thermal conductivity of GFS@rGO hybrid thermal management films having different rGO contents, respectively.

Another factor affecting the thermal conductivity of the GFS@rGO hybrid thermal management film is a rGO content of the hybrid thermal management film. FIG. 3B illustrates results of measuring in-plane thermal conductivity and through-plane thermal conductivity of GFS@rGO hybrid thermal management films, respectively, which use GFS that have an average lateral size of 1250 nm but have different rGO contents. Herein, a thickness of the film was fixed as 30 μm. Referring to FIG. 3B, it was found that the in-plane thermal conductivity of the GFS@rGO hybrid thermal management film significantly increased as the rGO content increased. This is because the rGO has higher intrinsic thermal conductivity than the GFS. However, as the rGO content increases, the electrical conductivity of the film increases due to the formation of an electrically conductive path by a rGO connection. When the rGO content is less than 10 wt %, a GFS filler having a relatively lower intrinsic thermal conductivity may be not properly overlapped by a rGO filler having a relatively high thermal conductivity, thereby decreasing the effect of improving the thermal conductivity. When the rGO content exceeds 10 wt %, an appropriate bridge of the rGO filler may have a high phonon transport efficiency between adjacent GFS fillers, thereby improving the in-plane thermal conductivity.

Similarly, the through-plane thermal conductivity of the GFS@rGO hybrid thermal management film gradually increased as the rGO filler increased, but this increase in the through-plane thermal conductivity was much lower than the increase in the in-plane thermal conductivity. When the rGO content was 20 wt %, the through-plane thermal conductivity exhibited 14.3 $W·m^{-1}·K^{-1}$, which was much lower than the in-plane thermal conductivity value (212 $W·m^{-1}·K^{-1}$).

GFS-rGO-GFS bonding provided a direct thermally conductive path for thermal conduction along an in-plane direction and, as a result, it appears that higher thermal conductivity and enhanced efficiency were achieved along the in-plane direction. Since heat generated in a small electronic device such as a smart phone or a tablet PC may be transferred along the in-plane direction, thermal management characteristics may be improved by using the hybrid thermal management film according to the present disclosure.

Figure 3C:
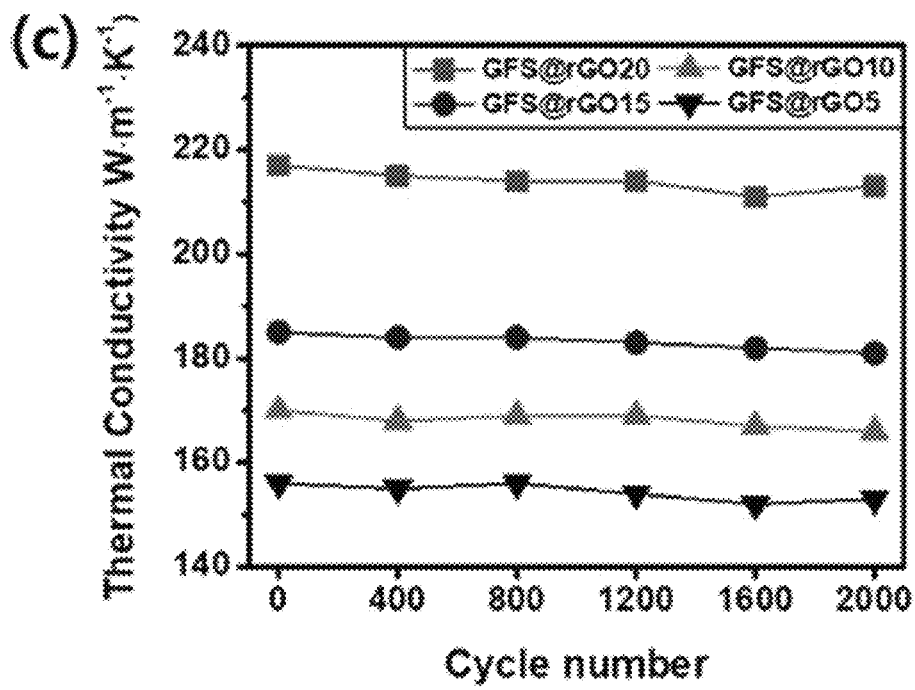
FIG. 3C illustrates results of measuring in-plane thermal conductivity according to the number of bending cycles of GFS@rGO hybrid thermal management films.
Figure 3D:
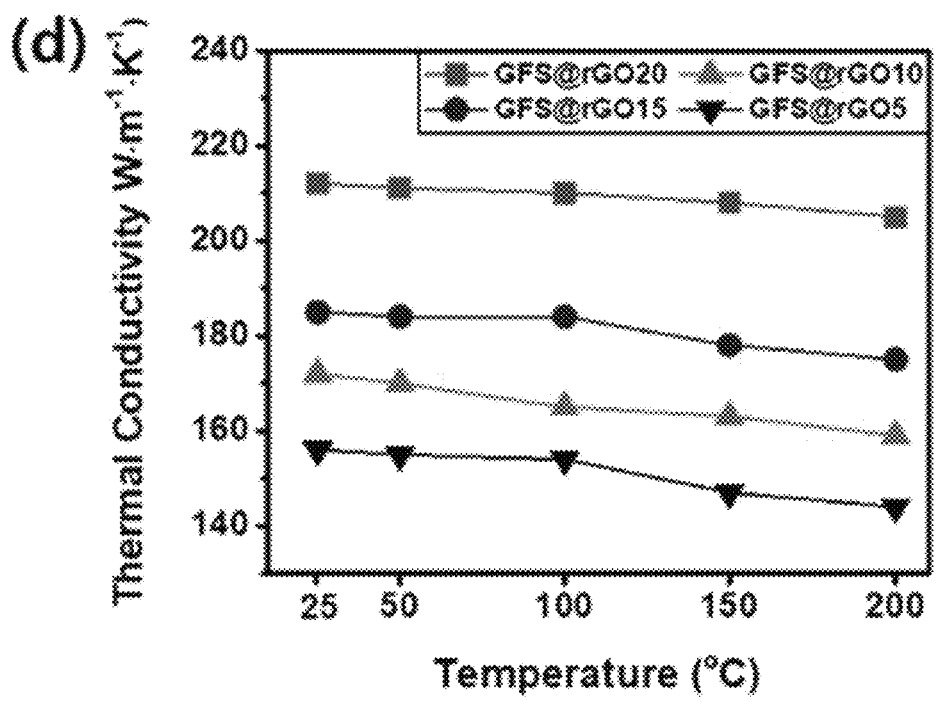
FIG. 3D illustrates results of measuring in-plane thermal conductivity of GFS@rGO hybrid thermal management films according to different temperatures and rGO contents.

FIG. 3C illustrates the in-plane thermal conductivity according to the number of bending cycles of the GFS@rGO hybrid thermal management film. In order for a thermal management film to be utilized in a flexible electronic device, it is very important that the thermal management film maintains its thermal conductivity even after multiple bending cycles. Referring to FIG. 3C, it was found that the in-plane thermal conductivity of the thermal management film remained constant within an experimental tolerance even after the thermal management film was subjected to 2000 bending cycles with a bending radius of 4 mm FIG. 3D illustrates thermal conductivity of GFS@rGO hybrid thermal management films according to a temperature and a rGO content. The in-plane thermal conductivity of the GFS@rGO hybrid thermal management films decreased slightly as the temperature rose to 200° C.

Figure 4A:
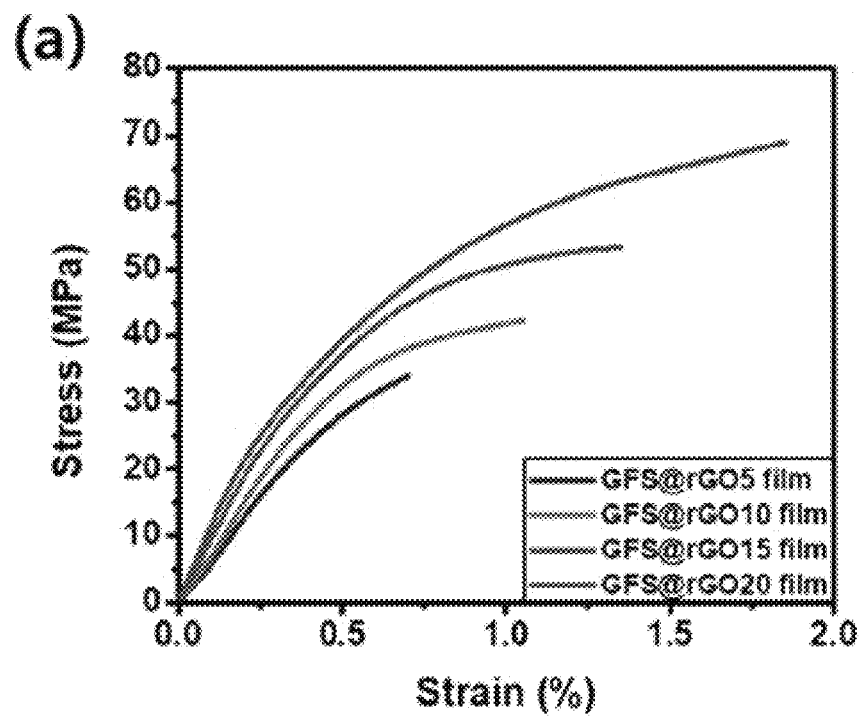
FIG. 4A illustrates stress-strain curves for GFS@rGO hybrid thermal management films having various rGO contents.

Meanwhile, mechanical strength is important for the film to continue to function in conjunction with other components in the device. FIG. 4A illustrates stress-strain curves for GFS@rGO hybrid thermal management films with various rGO contents. Young's modulus of the film was estimated as a slope of an approximately linear relationship between tensile stress and strain in a low strain range. Referring to FIG. 4A, it is shown that tensile strength, Young's modulus, and elongation at break of the hybrid thermal management film increase as the rGO content increases. On the other hand, tensile strength and Young's modulus of bare GFS film of a comparative example were 29.2 MPa and 0.6 GPa, respectively, and tensile strength and Young's modulus of the hybrid thermal management film according to the present disclosure were increased to 69.3 MPa and 12.1 GPa, respectively. In addition, as the rGO content increased to between 5 and 20 wt %, the elongation at break increased from 0.70% to 1.86%. It appears that since rGO is well aligned along the surface of the film and forms a network through good connection with the GFS, the tensile strength and the elongation at break are increased.

Figure 4B:
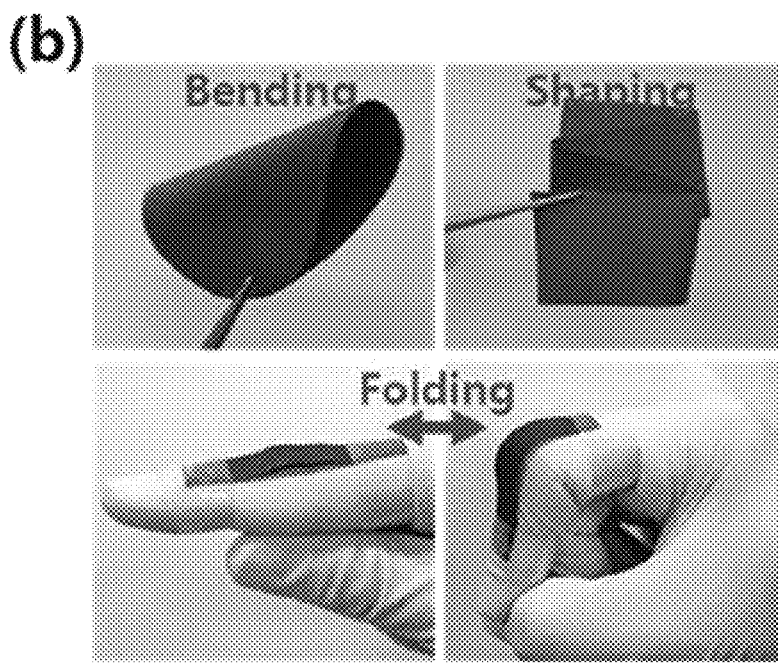
FIG. 4B illustrates images to show excellent mechanical flexibility of the GFS@rGO20 hybrid thermal management film.

FIG. 4B illustrates an image to show excellent mechanical flexibility of the GFS@rGO20 hybrid thermal management film. The GFS@rGO20 hybrid thermal management film was highly flexible and did not break or crack even after being bent or folded many times. (higher than 1000 times)

Figure 4C:
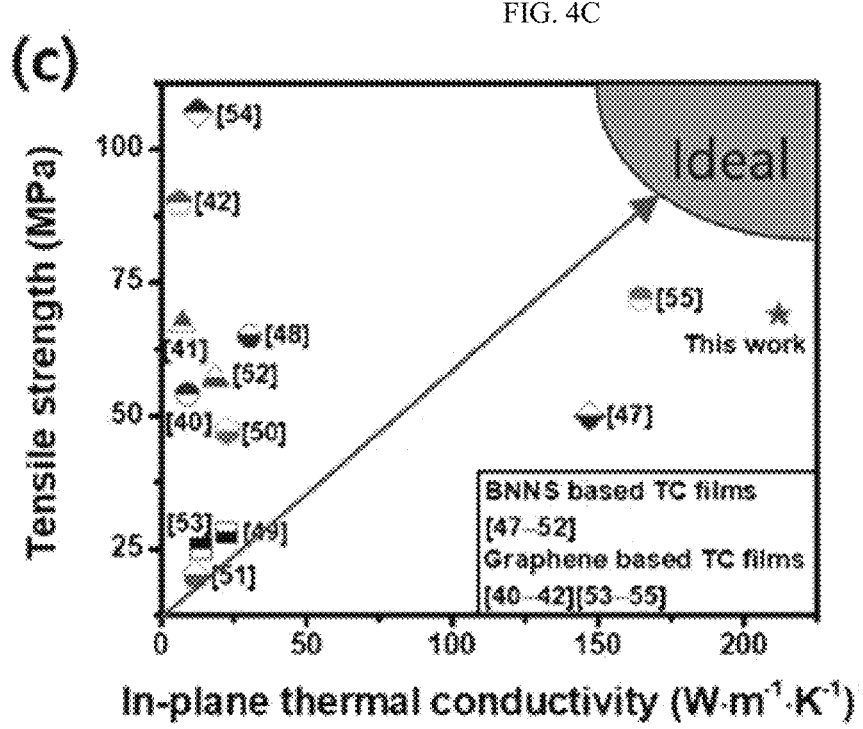
FIG. 4C illustrates a summarizing tensile strength versus in-plane thermal conductivity for boron nitride nanosheet (BNNS)-based thermally conductive films and graphene sheet-based thermally conductive films.

FIG. 4C illustrates a graph summarizing tensile strength versus in-plane thermal conductivity for boron nitride nanosheet (BNNS)-based thermally conductive films and graphene sheet-based thermally conductive films. Referring to FIG. 4C, it can be seen that the GFS@rGO20 hybrid thermal management film according to the present disclosure among these thermally conductive hybrid thermal management films exhibits excellent thermal conductivity (212 $W·m^{-1}·K^{-1}$) and excellent tensile strength (69.3 MPa).

Figure 4D:
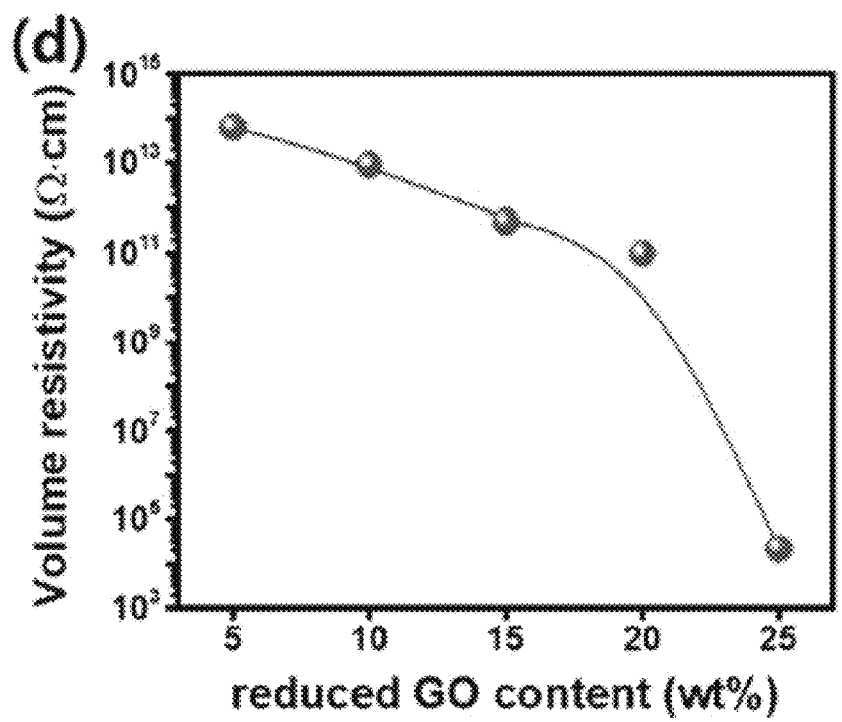
FIG. 4D illustrates results of measuring a volume resistivity of GFS@rGO20 hybrid thermal management films according to rGO contents.

In addition to high thermal conductivity and excellent flexibility, electrical conductivity must also be considered when the thermal management film is used in electronic devices. Accordingly, in FIG. 4D, volume resistance of the GFS@rGO20 hybrid thermal management film was observed. The GFS@rGO20 hybrid thermal management film exhibited a volume resistivity of $6.3 \times 10^{13}$ Ω·cm due to its excellent electrical insulating properties. As the rGO content increases, the volume resistivity decreases. However, it can be seen that when the rGO content is increased to 20 wt %, a resistance value higher than a critical resistance for electrical insulation ($10^9$ Ω·cm) is maintained. In contrast, when the rGO content exceeds 20 wt %, the volume resistivity of the GFS@rGO20 hybrid thermal management film decreases rapidly. Accordingly, in order to manufacture a film that is excellent in both thermal conductivity and electrical insulation, the rGO content was limited to within 20 wt %.

Figure 4E:
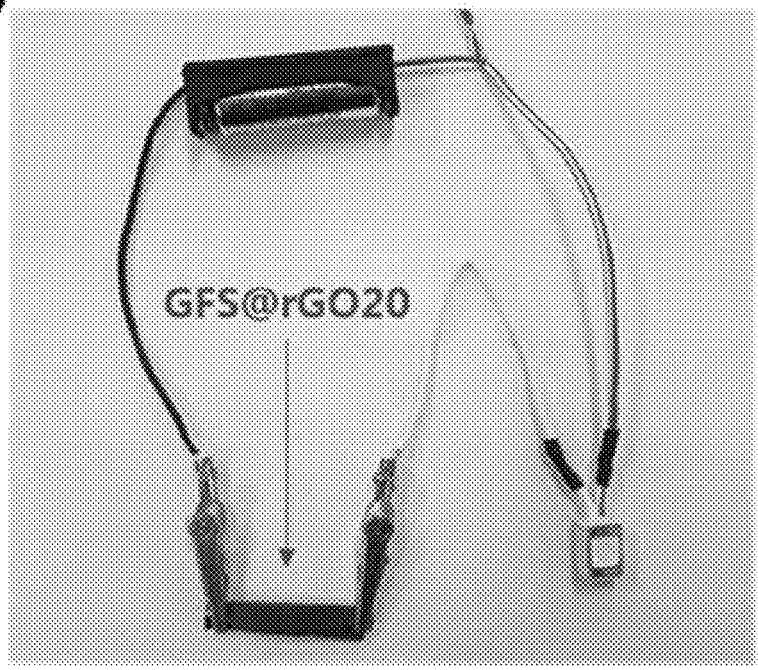
FIG. 4E illustrates an image illustrating a case where a GFS@rGO20 hybrid thermal management film operates as an insulator.
Figure 4F:
FIG. 4F illustrates an image illustrating a case where a GFS@GO25 hybrid thermal management film operates as a conductor.

Referring to FIG. 4E, the GFS@rGO20 hybrid thermal management film does not light up a light-emitting diode (LED), so it can be seen that the GFS@rGO20 hybrid thermal management film is an insulator. However, referring to FIG. 4F, the GFS@rGO25 hybrid thermal management film lights up the LED, so it can be seen that the GFS@rGO20 hybrid thermal management film is a conductor.

FIG. 5 illustrates results of comparing heat dissipation properties of a recently commercialized polyimide film (PI film) and a hybrid thermal management film of the present disclosure. An LED chip was mounted on each of the PI film and the GFS@rGO20 hybrid thermal management film, which simulated a substrate of a wearable electronic device, and a thermally conductive grease layer having a thickness of less than 5 μm was used as an adhesive to fill a gap between the LED chip and the film. When the LED was turned on, a temperature of the LED chip was recorded through an infrared thermal imaging camera (E5, FLIR Co., Sweden).

Figure 5A:
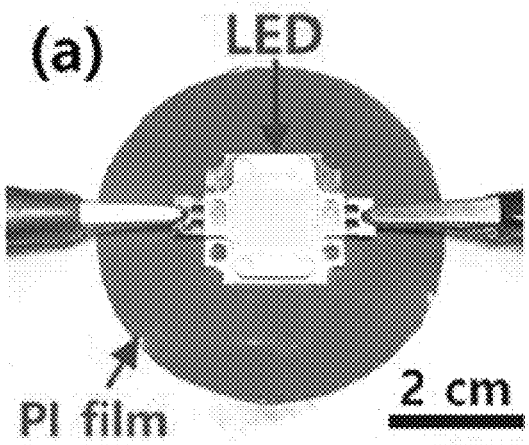
FIG. 5A illustrates digital photo of LED mounted on PI substrate.
Figure 5B:
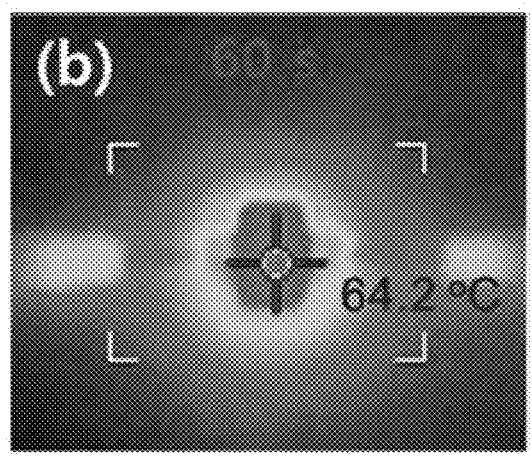
FIG. 5B and FIG. 5C illustrate the corresponding infrared thermal images of the system after the LED illumination for 60 and 180 s, respectively.
Figure 5C:
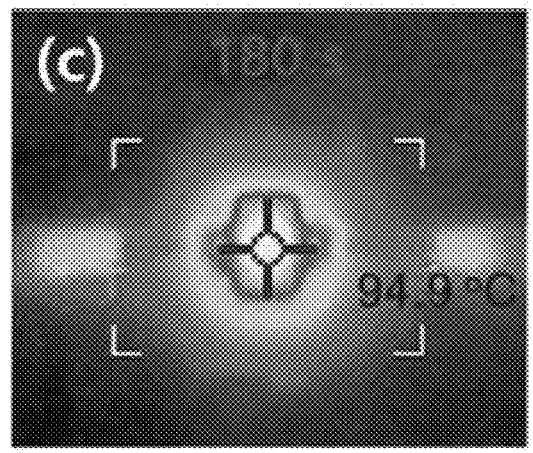
Figure 5D:
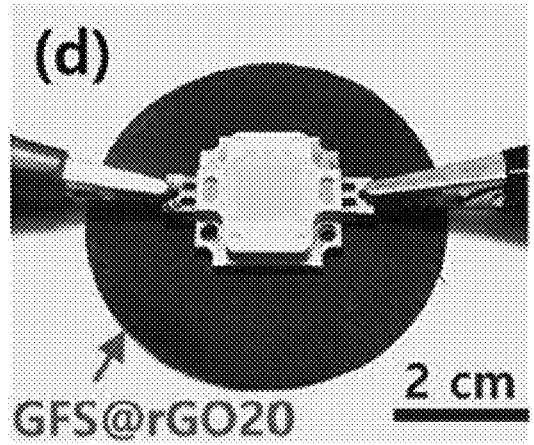
FIG. 5D illustrates digital photo of LED mounted on GFS@rGO20 film as a substrate.
Figure 5E:
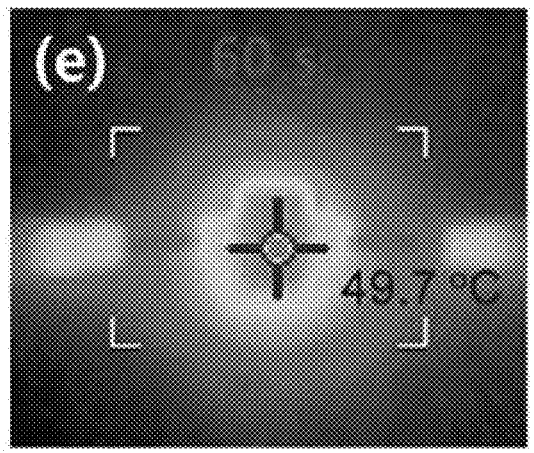
FIG. 5E and FIG. 5F illustrate the corresponding infrared thermal images of the system after the LED illumination for 60 and 180 s, respectively.
Figure 5F:
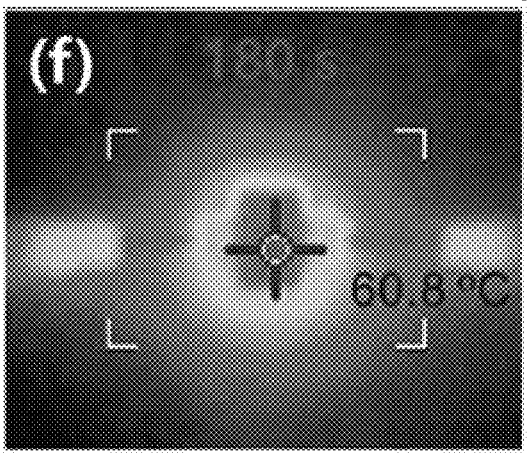

Referring to FIG. 5B, a temperature of the LED chip on the PI film rapidly increased to 64.2° C. after 1 minute and then reached a maximum temperature of 94.9° C. after 3 minutes, while a temperature of the LED chip on the GFS@rGO20 hybrid thermal management film reached a maximum temperature of only 60.8° C. after 3 minutes. From these results, it can be seen that the GFS@rGO20 hybrid thermal management film exhibits significantly improved heat dissipation. In addition, from these results, it was confirmed that the GFS@rGO hybrid thermal management film of the present disclosure may be used as a thermal management film in a flexible electronic device.

Meanwhile, referring to FIG. 6, the GO film and the GFS@rGO20 hybrid thermal management film were exposed to a flame in an atmosphere to observe flame retardancy of both films.

Figure 6A:
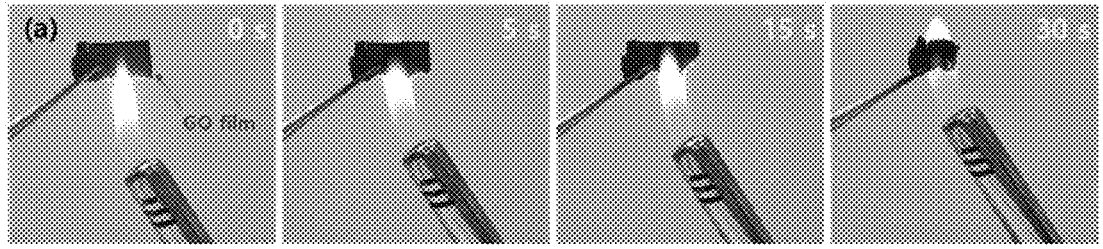
FIG. 6A and FIG. 6B illustrate results of observing flame retardancy of a GO film and a GFS@rGO20 hybrid thermal management film after exposing both films to flame in an atmosphere.
Figure 6B:
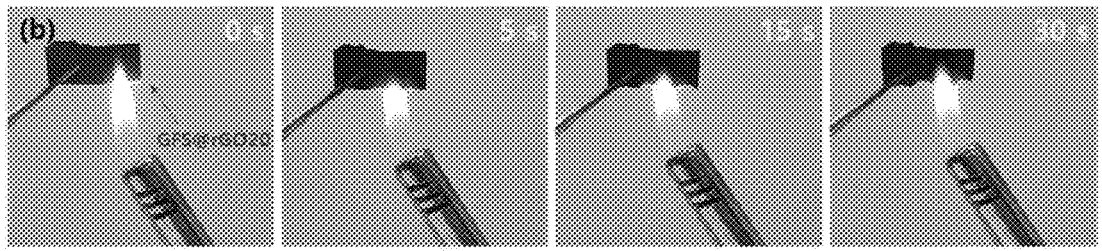

Referring to FIG. 6A, the GO film showed explosive combustion, and a portion of the GO film exposed to the flame was completely burned, thereby leaving a huge amount of black ash. However, referring to FIG. 6B, the GFS@rGO20 hybrid thermal management film did not catch fire initially and emitted a small amount of white smoke. After exposure to the flame for 30 seconds, the edge of the GFS@rGO20 hybrid thermal management film was partially burned. This phenomenon shows that fluorine coverage plays an important role in determining the flame retardant properties of the GFS@rGO20 film.

Figure 6C:
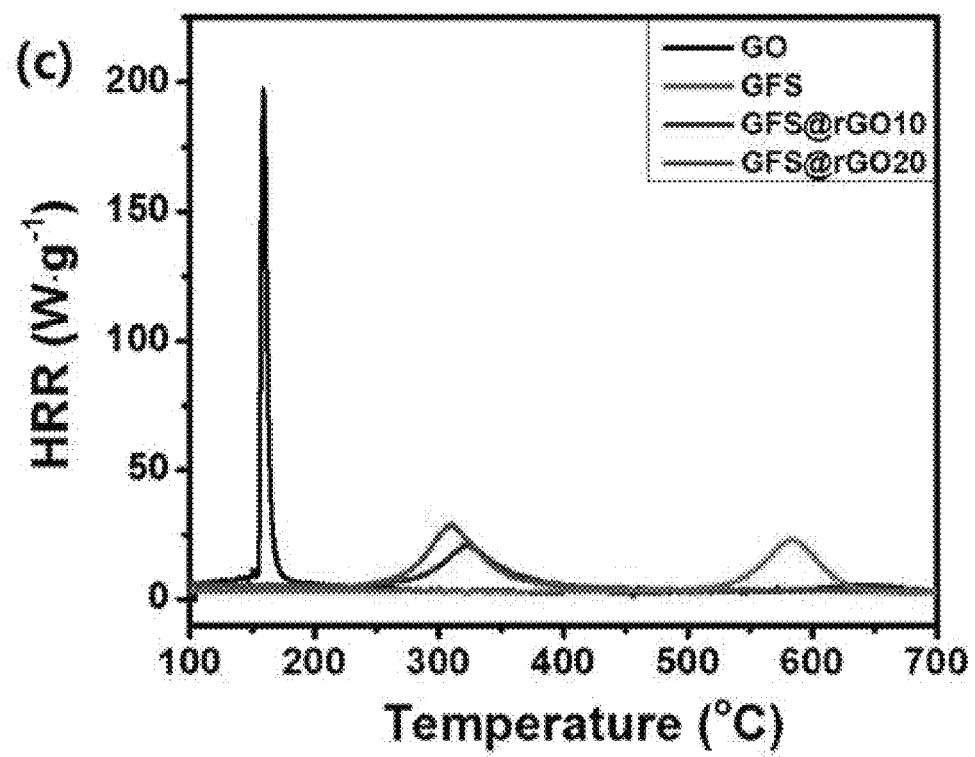
FIG. 6C illustrates heat release rate (HRR) curves of GO, GFS and GFS@rGO films.

An effective method of determining the combustion of a material on a small scale is microcombustion calorimetry (MCC). Accordingly, the properties of the film with respect to its potential flammability performance were analyzed by using MCC. An experiment was carried out by pyrolyzing a sample in a $N_2/O_2$ (80:20) gas mixture at a heating rate of 1° $C.·s^{-1}$ at 100° C. to 700° C. Referring to FIG. 6C, typical heat release rate (HRR) curves of GO, GFS, and GFS@rGO films are illustrated. The GO exhibited an abrupt HRR curve in a range of 150° C. to 200° C. and a peak HRR as high as 198 $W·g^{-1}$ at 159° C., which shows that the GO underwent a pyrolysis process in a narrow temperature range. Meanwhile, a HRR peak of the GFS was about 24 $W·g^{-1}$ at a temperature of 584° C., which shows excellent fire retardant properties of the GFS. Interestingly, the GFS@rGO hybrid thermal management film exhibited a much lower HRR at high temperatures as compared to the GO. Although only two GFS@rGO samples were tested, it may be assumed that the HRR curve tends to shift to the left, that is, towards the HRR curve of the GO as the rGO content increases. The peak HRR of the GFS@rGO20 film was 29 W·g$^{-1}$ at 311° C., and the GFS@rGO10 film exhibited a low peak HRR of 21 W·g$^{-1}$ at 323° C. This may be because flame shielding effectiveness of the rGO filler is lower than that of the GFS filler. Accordingly, a higher rGO filler may increase higher gas diffusion in the hybrid thermal management film. It is worth noting that a high degree of reduction of the rGO may improve the fire retardant properties of a composite.

Figure 6D:
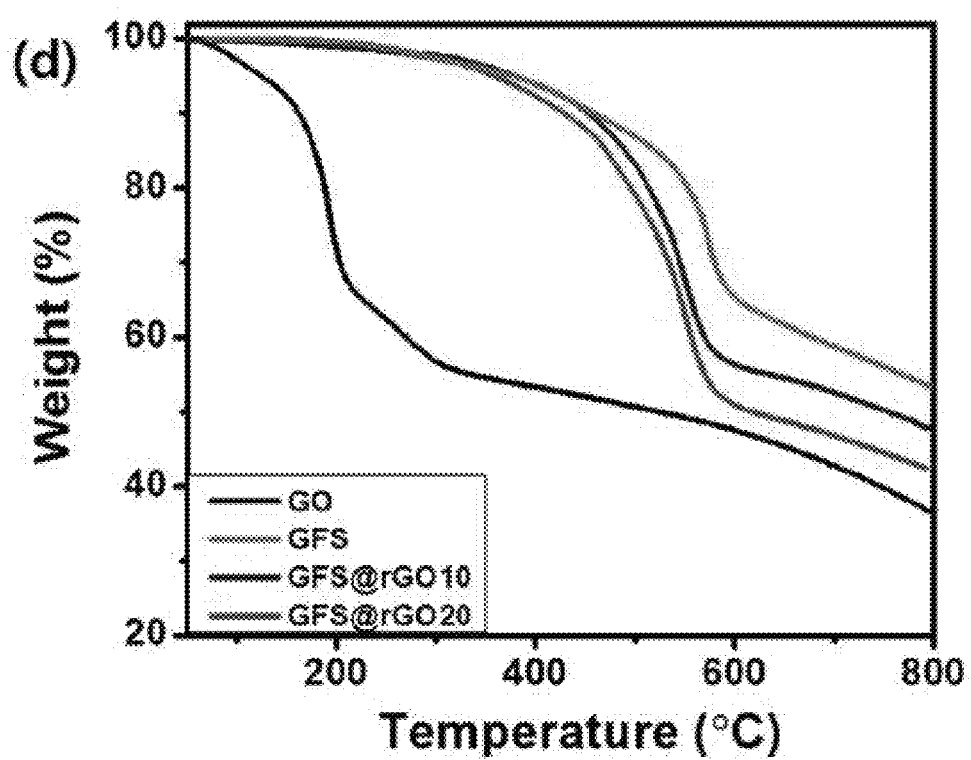
FIG. 6D illustrates thermal gravimetric analysis (TGA) curves of GO, GFS and GFS@rGO films under a nitrogen atmosphere.

FIG. 6D illustrates thermal gravimetric analysis curves for analyzing thermal stability of GO, GFS, and GFS@rGO films. Since the GO is thermally unstable, the GO begins to lose weight at about 100° C. The major mass loss of the GO occurred in a temperature range of 100 to 300° C., which may be related to degradation of an oxygen-containing functional group. A char yield of the GO was 38%. The GFS exhibited the highest thermal stability. On the other hand, it can be seen that the GFS@rGO hybrid thermal management film is more stable than the GO film. Most of the thermal decomposition of the GFS film occurred in a temperature range of 500 to 600° C., and the GFS film exhibited a char yield of 54% at 800° C. The GFS@rGO10 and GFS@rGO20 films gradually deteriorated in a temperature range of 300-800° C. It can be seen that the GFS@rGO10 maintained a residual mass of up to 47% of an initial mass at 800° C., while a char yield of the GFS@rGO20 film was 42% at 800° C. The rGO contains an unreduced oxygen functional group that is always present. Accordingly, as the rGO content increases, the residual mass of the GFS@rGO20 may become lower.

Features, structures, effects, and the like described in the above-described embodiments are included in at least one embodiment of the present disclosure, and are not necessarily limited to only one embodiment. Further, features, structures, effects, and the like illustrated in each embodiment may be combined or modified by those of ordinary skill in the art to which the present disclosure belongs, and implemented in other embodiments. Accordingly, contents related to such combinations and modifications should be construed as being included in the scope of the present disclosure.

In addition, although the present disclosure has been described above with reference to the embodiments, these are only examples and do not limit the present disclosure, and those of ordinary skill in the art to which the present disclosure belongs will appreciate that various modifications and applications not illustrated above are possible without departing from the essential characteristics of the present embodiment. For example, each component specifically presented in the embodiments may be modified and implemented. In addition, differences with respect to such modifications and applications should be construed as being included in the scope of the present disclosure defined in the appended claims.

What is claimed is:

1. A hybrid thermal management film for electronic devices that has thermal conductivity and electrical insulation, comprising:
   graphene fluoride nanosheets (GFS); and
   reduced graphene oxide (rGO);
   wherein the rGO and GFS are aligned in an in-plane direction of the hybrid thermal management film and the rGO forms a network through connection with the GFS,
   wherein the network through connection provides a directly thermally conductive path for thermal conduction along the in-plane direction, and
   wherein the rGO is included in an amount of 5 wt % to 20 wt % based on a total weight of the hybrid thermal management film.

2. The hybrid thermal management film of claim 1, wherein the graphene fluoride nanosheets are exfoliated from graphite fluoride.

3. The hybrid thermal management film of claim 1, wherein a lateral size of the graphene fluoride nanosheets is 100 to 2000 nm.

4. A method for manufacturing the hybrid thermal management film of claim 1, comprising:
   preparing the graphene fluoride nanosheets;
   mixing graphene oxide with the graphene fluoride nanosheets;
   performing vacuum filtration on a mixture of the graphene fluoride nanosheets and the graphene oxide to obtain the hybrid thermal management film; and
   reducing the hybrid thermal management film.

5. The method of claim 4, wherein preparing the graphene fluoride nanosheets comprises:
   mixing graphite fluoride with a solvent;
   performing ball-milling on a mixture of the graphite fluoride and the solvent to obtain a suspension of the graphene fluoride nanosheets; and
   performing centrifugation on the suspension to separate the graphene fluoride nanosheets.

6. The method of claim 5, wherein the ball-milling is performed for 2 to 12 hours under nitrogen gas.

7. The method of claim 4, wherein a lateral size of the graphene fluoride nanosheets is 100 to 2000 nm.

8. The method of claim 4, wherein, in the mixing the graphene oxide, the graphene oxide is included in an amount of 5 wt % to 20 wt % based on a total weight of the mixture.

9. The method of claim 4, wherein in the reducing the hybrid thermal management film, the hybrid thermal management film is treated with a chemical reducing agent.

10. The method of claim 9, wherein the chemical reducing agent is selected from the group consisting of hydrogen iodide, hydrazine, hydrobromic acid, sodium borohyride, lithium aluminum hydride, hydroquinone, sulfuric acid, and mixtures thereof.

* * * * *